United States Patent Office 3,484,413
Patented Dec. 16, 1969

3,484,413
POLYURETHANES PREPARED FROM THE CYCLIZATION PRODUCT OF A POLY- GLYCIDYL CARBAMATE
Marvin L. Kaufman, Carnegie, Pa., assignor to Mobay Chemical Company, Pittsburgh, Pa., a corporation of Delaware
No drawing. Filed Apr. 29, 1968, Ser. No. 725,177
Int. Cl. C08g 22/08
U.S. Cl. 260—77.5          10 Claims

ABSTRACT OF THE DISCLOSURE

Elastomeric products are prepared from a one container system which is a mixture of an organic polyisocyanate and the reaction product of a polyisocyanate and glycidol. This reaction product contains no groups reactive with isocyanate groupts, however, upon heating, the glycidyl carbamate groups are converted to a 5-hydroxytetrahydro-1,3-oxazine-2-one which contains hydroxyl groups and is reactive with polyisocyanates to form elastomeric products.

---

This invention relates to polyurethane elastomers and and a method of preparing the same. More particularly, it relates to stable mixtures of reactive components which when heated form elastomeric polyurethanes.

It has been heretofore known to prepare polyurethane casting compositions by mixing organic polyisocyanates and organic compounds containing active hydrogen atoms such as hydroxy polyesters, polyethers and the like and, if necessary, a chain extending agent, which is generally a low molecular weight active hydrogen bearing material such as glycols, triols, diamines and the like, and casting, or in a variety of other techniques, shaping the reaction mix into the desired configuration whether it be a printing roll, automative shock absorbers, or the like. While this technique has found wide-spread application in the industrial world, it is a characteristic disadvantage of these systems that once the isocyanate and active hydrogen compound are mixed together the work life of the mixture is relatively short and once the materials are mixed and reacted they cannot be subsequently used again. Thus, waste materials are generally discarded because no satisfactory technique of recovering the material has been brought forth.

A second disadvantage of this type of system is that a manufacturer of the raw materials must sell and ship them in separate containers and provide his customers of these materials with detailed instructions on the manner of mixing and reacting to achieve the ultimate properties in the polyurethane. This places the actual physical steps of mixing and reacting in the hands of persons without the control of the manufacturer of the materials.

It is therefore an object of this invention to provide improved polyurethane elastomers. It is another to provide an improved method of making polyurethane elastomers. It is still another object to provide a composition which is converted to a polyurethane elastomer merely by heating. It is another object of this invention to provide a stable mixture of an organic polyisocyanate and another compound, which when heated will form a polyurethane elastomer.

The foregoing objects and others which will become apparent from the following description are accomplished in accordance with the invention, generally speaking, by providing stable mixtures of reactants and polyurethane elastomers resulting therefrom by reacting an organic polyisocyanate and glycidol, heating the products to form the 5-hydroxytetrahydro-1,3-oxazine-2-one and reacting with a quantity of organic polyisocyanate such that the NCO to OH ratio based on the OH groups of the 5-hydroxytetrahydro-1,3-oxazine-2-one is from about 0.9 to about 1.2.

As is presently known, an organic isocyanate will react with an hydroxyl group of an organic compound under substantially all conditions. The organic polyisocyanate reacts with glycidol in accordance with the following equation:

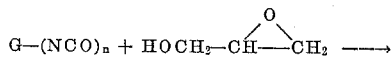
a glycidyl carbamate

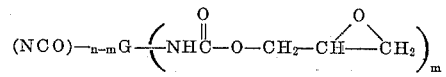

wherein G is the residue remaining after the removal of at least one NCO group from an organic polyisocyanate, and $n$ is an integer equal to the number of NCO groups originally present before reaction and $m$ is an integer equal to the number of NCO groups reacted.

In the preparation of polyurethane elastomers, any suitable organic polyisocyanate may be used to prepare the glycidyl carbamate including both monomeric polyisocyanate and those prepared by reacting an excess of an organic polyisocyanate with an organic compound containing active hydrogen atoms that are reactive with NCO groups.

Any suitable monomeric organic polyisocyanate may be used such as, for example, ethylene diisocyanate, ethylidene diisocyanate, propylene-1,2-diisocyanate, butylene-1,3-diisocyanate, cyclohexylene-1,2-diisocyanate, 2,4-tolylene diisocyanate, 2,6-tolylene diisocyanate, 4,4'-diphenyl methane diisocyanate, paraphenylene diisocyanate, methaphenylene diisocyanate, xylylene diisocyanate, 1,4-naphthylene diisocyanate, 1,5-napthylene diisocyanate, diphenyl-4,4'-diisocyanate azobenzene-4,4'-diisocyanate, diphenylsulfone-4,4'-diisocyanate, dichlorohexylmethane-4,4'-diisocyanate, tetramethylene diisocyanate, pentamethylene diisocyanate, hexamethylene diisocyanate, 1-chlorobenzene-2,4-diisocyanate, furfurylidene diisocyanate, 1,3,5-benzene triisocyanate, 4,4',4'',4'''-tetraphenylmethane tetraisocyanate, and the like.

Any suitable NCO terminated polyaddition product prepared by reacting excess of any of the above mentioned monomeric organic polyisocyanates with an organic compound containing active hydrogen atoms such as, for example, polyhydric alcohols, such as, ethylene glycol, 1,3-propanediol, 1,2-propanediol, 1,3-butanediol, 1,4-butanediol, 2,3-butanediol, 1,3-pentanediol, 1,4-pentanediol, 1,5-pentanediol, 2,3-pentanediol, 2,4-pentanediol, 1,6-hexanediol, 1,5-hexanediol, 1,4-hexanediol, 1,3-hexanediol, 2,3-hexanediol, 2,4-hexanediol, 2,5-hexanediol, 1,7-heptanediol, 1,5-heptanediol, 3,5-heptanediol, 1,10-decanediol, paraxylylene glycol, the bis-(b-hydroxy ethyl ether) of hydroquinone neopentyl glycol, glycerine, pentaerythritol, trimethylol propane, triethylolethane and the like; polyamines such as, for example, ethylene diamine, propylene diamine, butylene diamine, pentamethylene diamine, hexamethylene diamine, phenylene diamine, tolylene diamine, xylylene diamine, 4,4'-diamine diphenylmethane, cyclohexylene diamine, naphthylene diamine and the like; amino alcohols such as, for example, aminoethyl alcohol, aminopropyl alcohol, aminobutyl alcohol, and the like; polycarboxylic acids such as, for example, adipic acid, oxalic acid , succinic acid, methyl adipic acid, sebacic acid, glutaric acid, pimelic acid, azaleic acid, suberic acid, phthalic acid, terephthalic acid, isophthalic acid, 1,2,4-benzene tricarboxylic acid, thiodiglycolic acid, thiodipropionic acid, maleic acid, fumaric acid, itaconic acid, citraconic acid and the like; polymeric active hydrogen containing compounds such as, for example, polyesters prepared by reacting any of the above-mentioned polyhydric alcohols with any of the above-mentioned polycarboxylic acids and also those polyesters prepared from lactones such as caprolactone and the like; polyhydric polyalkylene ethers such as, for example, the condensation products of an alkylene oxide such as ethylene oxide, propylene oxide, butylene oxide, amylene oxide and the like with a suitable initiator such as water or any of the polyalcohols, polyamines or aminoalcohols, set forth above and prepared by any of the well-known processes such as, for example, that described by Wurtz in 1859 and in the "Encyclopedia of Chemical Technology," volume 7, pages 257–262, published by Interscience Publishers, Inc., 1951, or in United States Patent 1,922,459 and the like; polyesteramides such as the reaction product of an amino alcohol with a polycarboxylic acid or a mixture of an amine and a polyhydric alcohol with a polycarboxylic acid such as any of those set forth above; a polyhydric polythioether such as, for example, the reaction product of any of the above mentioned alkylene oxides set forth with regard to the preparation of polyethers with a polyhydric thioether such as thiodiglycol, 3,3'-dihydroxypropyl sulfide, 4,4'-dihydroxypropyl sulfide, butyl dihydroxypropyl sulfide, 1,4-($\beta$-hydroxyethyl) phenylene dithioether and the like; any suitable polyacetal such as, for example, the reaction product of an aldehyde such as, for example, formaldehyde, paraldehyde, butyraldehyde and the like with any of the polyhydric alcohols set forth above; any suitable polycarbonate such as, for example, the reaction product of phosgene with a polyhydric alcohol such as any of those set forth above or a polyphenol such as hydroquinone, Bisphenol A and the like may be used.

In the preparation of polyaddition compounds containing NCO groups which are generally referred to as prepolymers, an organic polyisocyanate is used in an excess of that required to react with the active hydrogen atoms of the particular active hydrogen bearing compounds.

The organic polyisocyanate is then reacted with glycidol in order to achieve compositions in accordance with the product of Equation I. The glycidol is used in an amount equal to or less than the amount of NCO groups present in the polyisocyanate, that is, one mol of glycidol will react with each NCO group. If an amount of glycidol less than this amount is used, free NCO groups will be present in the product. Thus, depending upon the desired product, any number of NCO groups can be replaced by correctly choosing the amount of glycidol to be employed. In a specific embodiment for preparing one container elastomers, it is desirable to use about one mol of glycidol per mol of diisocyanate. This gives an NCO to OH ratio of about 1 in the final reaction after heating and rearrangement of the glycidyl carbamate in accordance with the following.

The glycidyl carbamate group

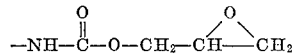

group rearranges upon heating generally in excess of about 100° C. to form the 5-hydroxy-tetrahydro-1,3-oxazine-2-one group in accordance with the following equation:

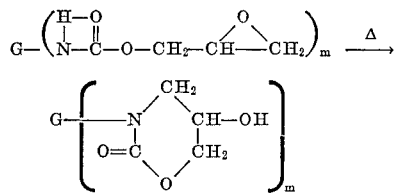

An N-substituted 5-hydroxytetrahydro-1,3-oxazine-2-one wherein G and $m$ have the same meaning as set forth above. It is observed from Equations I and II that the product of Equation I which contains no groups reactive with NCO groups under the given conditions can be converted to an hydroxyl bearing compound merely by heating. The temperature at which this conversion takes place varies according to the structure of the molecule and the presence of catalysts but is generally on the order of 100° C. However, this temperature can vary from as low as 80° C. to as high as 160° C. This makes it possible, if desired, to prepare a one-container polyurethane system. This can be done in a variety of ways, for example, as briefly described in the above embodiment, in conducting the reaction of Equation I, a sufficient quantity of organic polyisocyanate can be used to react both with the hydroxyl group of the glycidol and also with the hydroxyl group of the hydroxy-tetrahydro-oxazine-2-one which is formed upon heating. Thus, after the initial reaction of the organic polyisocyanate with the glycidol, an additional quality of unreacted polyisocyanate remains in the mixture and will not react until the epoxide ring is converted by heating to the hydroxy-tertahydro-oxazine-2-one. At this time, the further quantity of isocyanate will react to achieve an elastomeric product. Since, under normal conditions the isocyanate will not react with the addition product of the isocyanate and glycidol, the material can be stored in one container, shipped and processed by the customer merely by heating in order to convert the glycidyl carbamate groups to the hydroxy-tetrahydro-oxazine-2-one groups.

The same result can also be achieved by a two-step procedure by reacting one mol of glycidol for each NCO group present on the organic polyisocyanate to convert all of the NCO groups to glycidyl carbamate groups. A further quantity of polyisocyanate, either monomeric or polymeric, can be added and subsequently, when desired, the reaction mixture heated above the temperature necessary for formation of the hydroxy-tetrahydro-oxazine ring. Generally, the isocyanate is present in an amount with respect to the epoxide groups of the glycidyl carbamate such that the final NCO to epoxide ratio varies from about 0.9 to about 1.2.

It can be seen from this system that as long as the processor of the material does not heat the mixture of glycidyl carbamate and polyisocyanate above the temperature of formation of hydroxy-tetrahydro-oxazine groups, he will have a stable one-container system.

The rearrangement of the glycidyl carbamate to the hydroxy-tetrahydro-oxazine can be catalyzed by suitable catalysts such as, for example, the boron trifluoride adducts of monoethylamine, di-sec-butylamine, N,N-dimethylaniline and pyridine, that is, $BF_3 \cdot MEA$, $$BF_3 \cdot BU_2\text{-sec NH}$$

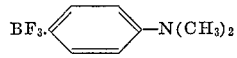

and

respectively. When a catalyst is used, the conversion of the inactive glycidyl carbamate to the active hydroxytetrahydro-oxazine may occur at a temperature less than 110° C.

In addition to the preparation of elastomeric polyurethanes from the glycidyl carbamates by conversion to the hydroxy-tetrahydro-oxazines and reaction with more organic polyisocyanate, the glycidyl carbamate can also be used in the customary reactions of epoxides with amines, hydroxy compounds including both alcohols and phenols, anhydrides and the like. These systems find application in adhesives, potting compositions and the like. The elastomeric polyurethanes can be fabricated into a variety of end products such as, for example, printing rollers, shoe soles and heels, motor mounts, automotive bumpers, and the like.

The invention will be further illustrated by the following examples in which parts are by weight unless otherwise specified.

EXAMPLE 1

Preparation of an —NCO terminated prepolymer

About 1000 parts of a polypropylene ether glycol having a molecular weight of about 1000 are added at room temperature to about 362.3 parts of an isomeric mixture of 80% 2,4- and 20% 2,6-tolylene diisocyanate. The reaction mixture is stirred at about 75° C. until reaction is complete. The addition product has an —NCO content of 7.1% and an unreacted monomeric tolylene diisocyanate content of about 4.6%. To about 1000 parts of the addition product thus prepared are added 23.85 parts of 1,4-butane diol. The resulting prepolymer has an —NCO content of 4.9% and an unreacted monomeric tolylene diisocyanate content of 0.3%.

Preparation of a glycidyl carbamate terminated prepolymer

About 145 parts (0.169 eq. NCO) of this prepolymer are charged into a round bottom flask equipped with a stirrer, thermometer, condenser addition funnel and nitrogen inlet and heated to about 60° C. About 13.5 parts of glycidol are added. The temperature is raised to 90 to 95° C. for about 3 hours. The reaction mix is put under reduced pressure to degas it. The mixture is permitted to stand overnight and then melted by heating to about 90° C. Infrared analysis indicates no glycidol left and the NCO content substantially decreased.

About 2.5 parts of glycidol are added and heated for about 2 hours. Infrared indicates only a small amount of NCO left. The mixture is again degassed at 90° C./4 mm. Hg. The reaction mixture is a viscous pourable liquid at 90° C.

Preparation of elastomer

About 139.8 parts of the same prepolymer having an —NCO content of 4.9%, prepared above, are added to the glycidyl carbamate terminated prepolymer. This gives an NCO to epoxide ratio of 1.05/1. This mixture is degassed and most of the product is poured into a bottle and stored overnight. The remainder is cast into an aluminum mold at about 280° F. for about ½ hour and then at 300° F. for about ½ hour and then at 315° F. for about 1 hour. There are no bubbles even at 315° F. The mold is permitted to remain at 250° F. overnight. The casting is transparent and has a Shore A hardness of about 40.

The major portion of the mixture is heated to about 90° C. and cast into molds on three successive days. No change in handling characteristics is observed. When cast into a silicone coated mold at 315° F. for about 100 minutes and cured overnight at 110° C., the castings exhibit the following physical properties:

Hardness, Shore A _____ 55
Tear strength _____p.l.i__ 30
Tensile strength _____p.s.i__ 1300
Elongation _____percent__ 335

EXAMPLE 2

To about 104 parts (0.112 eq. epoxide) glycidyl carbamate terminated prepolymer of Example 1 are added about 74.7 parts (0.117 eq. NCO) of an NCO terminated prepolymer having an NCO content of about 6.7% and prepared from 100 parts of an hydroxyl polyester having a molecular weight of about 2000, an hydroxyl number of about 56 and 40 parts of 4,4'-diphenylmethane diisocyanate. The hydroxyl polyester is prepared from 11 mols of ethylene glycol and 10 mols of adipic acid. The NCO to epoxide ratio is 1.05/1.

The mixture is degassed for several hours and kept under vacuum overnight and then cast into a slab mold and a cylinder mold. The castings are demolded in about 100 minutes at about 315° F. and cured at 110° C. overnight. The castings exhibit the following properties:

Hardness, Shore A _____ 59
Tear strength _____p.l.i__ 20
Tensile strength _____p.s.i__ 800
Elongation _____percent__ 265

EXAMPLE 3

To about 201.1 parts (0.216 eq. epoxide) of the glycidyl carbamate terminated prepolymer of Example 1 are added 28.4 parts (0.227 eq. NCO) of 4,4'-diphenylmethane diisocyanate. This gives an NCO to epoxide ratio of 1.05/1. The mixture is degassed at about 100° C./20 mm. Hg and cast into a mold at a temperature of 310° F. The sample is demolded in 1.5 hours and placed in an oven at about 110° C. overnight for final cure. The following properties are observed:

Hardness, Shore A _____ 91
Tear strength _____p.l.i__ 95
Tensile strength _____p.s.i__ 2630
Elongation _____percent__ 200

EXAMPLE 4

About 203.4 parts (0.919 eq. epoxide) of the glycidyl carbamate terminated prepolymer of Example 1, about 7.2 parts (0.0575 eq. NCO) of 4,4'-diphenylmethane diisocyanate and about 148 parts (0.1725 eq. NCO) of the prepolymer of Example 1 having an NCO content of 4.9% are mixed together. The mixture is degassed at about 100° C./20 mm. Hg and cast into a mold at 310° F. The sample is demolded in about 160 minutes and maintained in an oven at 110° C. overnight. The molding exhibits the following properties:

Hardness, Shore A _____ 61
Tear strength _____p.l.i__ 45
Tensile strength _____p.s.i__ 1300
Elongation _____percent__ 280

EXAMPLE 5

Preparation of a glycidyl carbamate terminated prepolymer

About 500 parts (0.785 mol) of the NCO terminated prepolymer of Example 2 having an NCO content of 6.7% are charged to a round bottom flask equipped with a stirrer, condenser, thermometer, nitrogen inlet and addition funnel. The prepolymer is heated to about 65° C. and about 64 parts (0.86 mol) glycidol are added gradually to prevent the temperature from raising above about 95° C. This is a 10% glycidol excess. The reaction temperature is maintained at 90 to 95° C. for 2 hours at which time IR indicates complete removal of NCO. The product is a viscous liquid pourable at 80 to 90° C.

Using a rotary evaporator, the product is degassed and the excess glycidol is stripped off at 100° C. and 1 mm. pressure.

Preparation of elastomer

To about 143.5 parts (0.202 eq. epoxide) of the above prepared addition product is added 141.5 parts (0.222 eq. NCO) of the same prepolymer used in the preparation of the addition product. This is an NCO to epoxide ratio of 1.1. The mixture is heated to 90 to 100° C., mixed thoroughly and degassed. The mixture is cast into molds at 310° F. The castings, demolded after 138 minutes, are clear, bubble free and after overnight curing at 110° C. exhibit the following properties:

Hardness, Shore A _____ 60
Tear strength _____p.l.i__ 40
Tensile strength _____p.s.i__ 1540
Elongation _____percent__ 270

EXAMPLE 6

To about 263.1 parts (0.371 mol) of the glycidyl carbamate terminated prepolymer of Example 5 are added about 46.4 parts (0.371 eq. NCO) of 4,4'-diphenylmethane diisocyanate. This is an NCO to epoxide ratio of 1/1. The mixture is degassed and stored overnight under vacuum. It is then heated in an oven to 125° C. and poured into a mold. The casting is demolded after 80 minutes and placed in an oven for 5 hours at 110° C. The casing exhibits the following properties:

| | |
|---|---|
| Hardness, Shore A | 95 |
| Tear strength p.l.i. | 170 |
| Tensile strength p.s.i. | 2160 |
| Elongation percent | 220 |

EXAMPLE 7

Preparation of a glycidol-butanediol-TDI adduct

In an apparatus similar to that used in Example 1, about 186.8 parts (1.074 mols) of 80/20 TDI and 75 parts by volume of benzene are heated to about 70° C. About 79.5 parts (1.074 mols) glycidol are added at a rate to prevent the temperature from rising above about 85° C., external cooling being used intermittently. After the addition of all the glycidol and termination of the exotherm, about 48.2 parts (0.535 mol) of 1,4-butanediol are added. Again an exotherm is observed and the temperature maintained below about 85° C. The reaction mixture increases in viscosity and turns yellow. After completion of this addition the temperature is maintained at between 80° C. to 85° C. for 1 hour and stripped of benzene. The product is a viscous yellow liquid.

Preparation of elastomer

About 133.8 parts of the prepolymer of Example 2 having an NCO content of 6.7% and about 58.6 parts of the addition product prepared above are mixed together and cast at 315° F. into a mold. The casting is demolded after about 90 minutes and cured overnight at 110° C. The casting exhibits the following properties:

| | |
|---|---|
| Hardness, Shore D | 50 |
| Tear strength p.l.i. | 140 |
| Tensile strength p.s.i. | 1290 |
| Elongation percent | 130 |

EXAMPLE 8

To about 601.2 parts of the prepolymer of Example 1 having an NCO content of 4.9 are added about 87 parts of an isomeric mixture of 80% 2,4- and 20% 2,6-tolylene diisocyanate. This mixture has an NCO content of 10.4%. To about 648.8 parts of this mixture are added about 56.6 parts of freshly distilled glycidol. The reaction temperature is kept below about 70° C. during the addition. After the addition the temperature is slowly raised to about 80° C. and maintained for 2 hours. The reaction mass is warmed to about 50° C. at which temperature it is pourable, and then heated to about 100° C. and degassed at about 100° C. and 10 mm. Hg for 0.5 hour. The product has an NCO to epoxide ratio of 1.1/1. The degassed material is cast into a mold heated to about 280° F., demolded after 180 minutes and stored overnight at 110° C. The casting exhibits the following properties:

| | |
|---|---|
| Hardness, Shore A | 93 |
| Tear strength p.l.i. | 100 |
| Tensile strength p.s.i. | 2530 |
| Elongation percent | 210 |

EXAMPLE 9

To about 700 parts of the prepolymer of Example 2 having an NCO content of 6.7% are added about 100 parts of 4,4'-diphenylmethane diisocyanate to yield a prepolymer having an NCO content of about 10%.

To about 766.2 parts of this modified prepolymer are added about 64.2 parts of glycidol, in an apparatus similar to that of Example 1. This will give an NCO to epoxide ratio of 1/1. The temperature is maintained between 70 and 75° C. during the addition and then stirred at 65–70° C. for 2 hours. The reaction mixture is a viscous liquid pourable at 70° C. The mixture is degassed and cast at about 280° F. The casting is demolded after about 250 minutes and cured overnight at 110° C. The sample exhibits the following properties:

| | |
|---|---|
| Hardness, Shore A | 74 |
| Tear strength p.l.i. | 85 |
| Tensile strength p.s.i. | 2600 |
| Elongation percent | 310 |

EXAMPLE 10

To about 152 parts of an isomeric mixture of 80% 2,4- and 20% 2,6-tolylene diisocyanate are added about 705 parts of an hydroxyl polyester having a molecular weight of about 2600 and prepared from 10 mols of adipic acid and 11 mols of diethylene glycol. The reaction mixture is stirred at about 75° C. until reaction is complete to yield a prepolymer having an NCO content of 5.66%.

In an apparatus similar to that of Example 1, about 179.6 parts of the above prepolymer are heated to 60 to 65° C. About 8.7 parts of glycidol are added and heated for about 1 hour at about 75° C. This gives an NCO to epoxide ratio of 1.05/1. The mixture is degassed at between 90° C. and 95° C. at 2 mm. Hg for about ½ hour. The addition product is fluid and easily handled.

The reaction mix is cast into a mold at 280° F. After about 100 minutes at this temperature the mold temperature is raised to about 290° F. for 5 hours and overnight at about 250° F. The castings are demolded and placed in an oven at about 110° C. for 8 hours. The casings are clear and bubble free. The sample exhibits the following properties:

| | |
|---|---|
| Hardness, Shore A | 60 |
| Tear strength p.l.i. | 10 |
| Tensile strength p.s.i. | 600 |
| Elongation percent | 185 |

EXAMPLE 11

To about 152 parts of an isomeric mixture of 80% 2,4- and 20% 2,6-tolylene diisocyanate are added about 650 parts of the hydroxyl polyester described in Example 2. Stirring is continued at 70° C. until the reaction is complete. The prepolymer has an NCO content of 5.48%. To about 356.8 parts of the resulting propolymer in the apparatus of Example 1 heated to about 60° C. are added about 16.8 parts of glycidol and the mixture is maintained at 70 to 75° C. with stirring for one hour. This gives an NCO to epoxide ratio of 1.05/1.

The reaction mixture is heated to 95° C. to 100° C. and degassed at about 5 mm. Hg for 5 minutes. It is cast into a mold at 300° F. and demolded after 260 minutes. The casting is cured in an oven overnight at 100° C. and is clear and bubble free. The sample exhibits the following properties:

| | |
|---|---|
| Hardness, Shore A | 57 |
| Tear strength p.l.i. | 15 |
| Tensile strength p.s.i. | 3125 |
| Elongation percent | 350 |

EXAMPLE 12

To about 152 parts of an isomeric mixture of 80% 2,4- and 20% 2,6-tolylene diisocyanate are added about 610 parts of an hydroxyl polyester having a molecular weight of about 2000 and prepared from 11 mols of 1,4-butanediol and 10 mols of adipic acid. Stirring is continued at about 70° C. until reaction is complete to yield a prepolymer having an isocyanate content of 5.75%.

To about 376.4 parts of this prepolymer warmed to about 60° C. in the apparatus of Example 1 are added dropwise about 18.6 parts of glycidol. This gives an NCO to epoxide ratio of about 1.05/1. The reaction mixture is heated to 70 to 75° C. for 1 to 2 hours after the addition is complete.

The mixture is heated to about 100° C. and degassed at about 5 mm. Hg for 5 minutes. The mixture is a very viscous liquid. This mixture is cast into a mold at 300° F. and kept at this temperature for 320 minutes and then overnight at 250° F. The casting is clear and bubble free and exhibits the following properties:

Hardness, Shore A _____ 62
Tear strength _____p.l.i__ 27
Tensile strength _____p.s.i__ 2560
Elongation _____percent__ 340

EXAMPLE 13

To about 260 parts of the prepolymer of Example 11 having an NCO content of 5.48% heated to about 60° C. in the apparatus described in Example 1 are added 13.1 parts of glycidol. The mixture is stirred for 1 hour and degassed. About 0.4 part of boron trifluoride monoethylamine complex (BF₃·MEA) are added as catalyst and the mixture again degassed at about 65° C.

A portion of this addition product is cast onto a table maintained at about 250° F. The solidified product is demolded in about 25 minutes. The remainder of the addition product is heated to 60 to 70° C. and cast into a mold at about 250° F. The casting sets up quickly and is demolded in about 50 minutes and cured for 6 hours at 270° F. The sample exhibits the following properties:

Hardness, Shore A _____ 60
Tear strength _____p.l.i__ 20
Tensile strength _____p.s.i__ 2400
Elongation _____percent__ 290

It should be understood that the examples present the best mode known for carrying out the invention and that they are for the purpose of illustration and not limitation. Further any of the organic polyisocyanates, either monomeric or polyaddition products of monomeric isocyanate with organic compounds containing active hydrogen atoms can be substituted throughout the examples for those particular compounds utilized therein.

Although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of polyurethane elastomers which comprises reacting an organic polyisocyanate with polyglycidol to prepare a polyglycidyl carbamate, heating said glycidyl carbamate and reacting the 5-hydroxytetrahydro-1,3-oxazine-2-one thus formed with a quantity of organic polyisocyanate such that the NCO to OH ratio based on the OH groups of the 5-hydroxytetrahydro-1,3-oxazine-2-one is from about 0.9 to about 1.2

2. The process of claim 1 wherein the organic polyisocyanate is an NCO terminated prepolymer prepared by reacting an excess of a monomeric organic diisocyanate with a polymeric polyol.

3. The process of claim 2 wherein the polymeric polyol is selected from the group consisting of hydroxyl polyesters, polyhydric polyalkylene ethers, polyhydric polyesteramides, polyhydric polythioethers, polyhydric polyacetals and polyhydric polycarbonates.

4. The process of claim 1 wherein the organic polyisocyanate is a monomeric diisocyanate and a monomeric glycol is reacted with the diisocyanate in addition to the glycidol.

5. The process of claim 1 wherein the organic polyisocyanate is an adduct of an excess of a monomeric polyisocyanate and an organic compound having active hydrogen atoms that are reactive with NCO groups.

6. The process of claim 1 wherein the organic polyisocyanate is difunctional and the said polyisocyanate and said glycidol are used in quantities to form a stable mixture of glycidyl carbamate and polyisocyanate, the NCO to epoxide group ratio of said mixture being from about 0.9 to about 1.2, heating the mixture to convert the

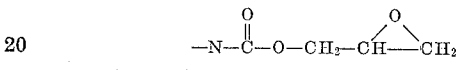

groups to

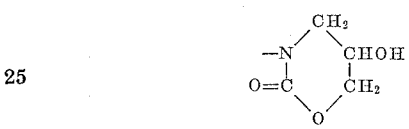

groups and shaping the reaction mixture into the desired configuraiton.

7. The polyurethane elastomer prepared by the process of claim 1.

8. A stable heat curable mixture of an organic polyisocyanate and a compound having the formula

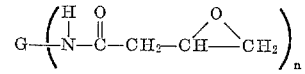

where G is the residue remaining after the removal of at least one NCO group from an organic polyisocyanate and $n$ is an integer equal to the number of NCO groups removed.

9. The stable mixture of claim 8 wherein the organic polyisocyanate is difunctional.

10. The stable mixture of claim 8 wherein the organic polyisocyanate is an NCO terminated prepolymer prepared by reacting an excess of an organic diisocyanate with a polymeric glycol.

References Cited

UNITED STATES PATENTS 2,701,246  2/1955  Drechsel.
2,744,897  5/1956  Drechsel.
2,830,038  4/1958  Pattison.
3,248,373  4/1966  Barringer.
3,313,747  4/1967  Schramm.
3,415,901  12/1968 Schramm et al.

OTHER REFERENCES

Iwakura et al., Journal of Organic Chemistry, vol. 24, pp. 1992–1994 (1959).

DONALD E. CZAJA, Primary Examiner

H. S. COCKERAM, Assistant Examiner

U.S. Cl. X.R.

260—47, 67, 75

Notice of Adverse Decision in Interference

In Interference No. 97,650 involving Patent No. 3,484,413, M. L. Kaufman, POLYURETHANES PREPARED FROM THE CYCLIZATION PRODUCT OF A POLYGLYCIDYL CARBAMATE, final judgment adverse to the patentee was rendered Oct. 12, 1972, as to claims 1, 2, 3, 4, 5, 6, 7, 8, 9 and 10.

[*Official Gazette February 6, 1973.*]